Nov. 23, 1954     J. J. FOLZ     2,695,182
JACKETED PIPE ASSEMBLY
Filed Sept. 22, 1950
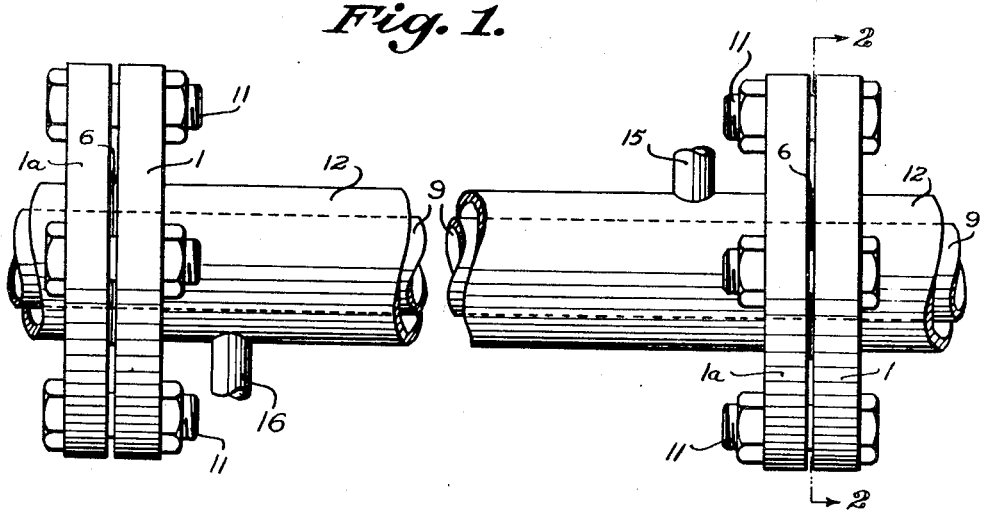
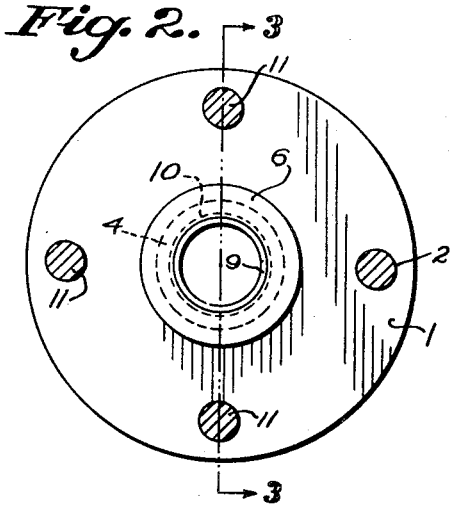
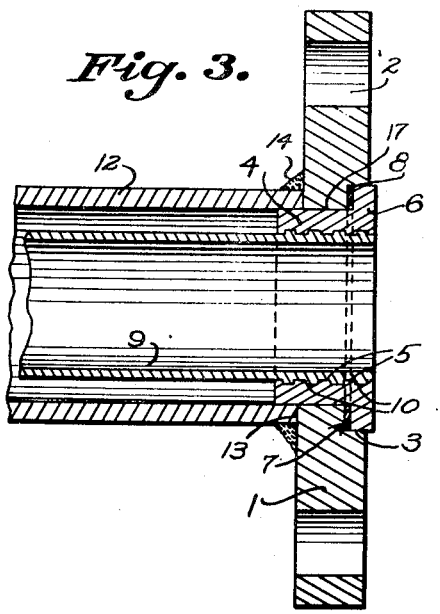
INVENTOR
Joseph J. Folz
BY Shreve, Crowe & Gordon
ATTORNEYS

United States Patent Office 2,695,182
Patented Nov. 23, 1954

2,695,182

JACKETED PIPE ASSEMBLY

Joseph J. Folz, Upper Darby, Pa., assignor, by mesne assignments, to Horace T. Potts Company, Philadelphia, Pa., a corporation of Pennsylvania Application September 22, 1950, Serial No. 186,290

2 Claims. (Cl. 285—22)

The present invention provides in jacket tube or pipe constructions and coupling assemblies therefor through which constructions and assemblies corrosive fluids are passed in heat exchange relation with a temperature controlling fluid circulating in heat exchange relation with an inner pipe through which the corrosive fluid is circulating. In handling corrosive chemical liquids, it is necessary for the piping system through which such liquids are circulating to be of corrosion resistant materials, such as lead or copper, where the present sufficient ductility and softness enables the pipe systems to be appropriately shaped in conformity with the structural contours of the environment in which the installation is placed. Usually also, the installations of this character comprise a plurality of sections coupled together in end-to-end relation, many types of coupling assemblies being employed for such purpose.

Despite careful precautions, there is present the problem of corrosion in such systems as well as adequately efficient heat transfer between the fluid in the inner pipe and the outer pipe. Corrosion is manifested particularly in and around the coupling assemblies interconnecting the ends of the sections of the pipe system. Such corrosion usually is attributable to slow leakage of liquids from the inner and outer pipes and prolonged retention of such liquids in contact with the parts of the coupling assemblies. In efforts to overcome the problem of corrosion and at the same time effect an inexpensive juncture of the ends of successive pipe sections as possible, the coupling assemblies at the ends of the pipe systems usually comprise a corrosion-resistant coupling element, such as for example a cast iron coupling flange element secured tightly and rigidly to the inner and outer pipes, this securing being accomplished by welding the connecting flange in place, a weld union being employed between the flange and both the inner and outer pipes. However, since stainless steel is frequently employed as the material for corrosive liquids, it is difficult to obtain a continuous and homogeneous weld of the cast iron flange member thereto; and additionally, the resulting heating of the stainless steel to welding temperatures impairs its corrosion resisting properties through conversion of portions of the nickel and chromium contents thereof into carbides as well as causing other structural changes in the metal which all contribute to reduction of corrosion resistance of the alloy.

Moreover, the high cost of stainless steel is objectionable in extensive installations, and it is desirable wherever possible to replace the stainless steel with other materials so far as possible that are less costly. In accordance with the present invention, the use of stainless steel is minimized and localized to areas where corrosion presents a particularly severe and obstinate problem.

Frequently in the food and chemical industries, it is necessary to maintain the temperature gradient of the fluid flowing through a line to within a few degrees regardless of the ambient temperature surrounding the pipe system. This is done by placing a pipe around the outside of the pipe or tube carrying the fluid in the piping system, thereby forming a heat-exchange jacket around the liquid-carrying pipe. A temperature controlling fluid is circulated in the annulus formed by the outside pipe and the inside pipe.

At present, jacketed tube systems are constructed in the following ways:

1. A fully corrosive resistant flange is used and the inner tube is welded to the bore of the flange and the outer pipe or tube is welded to the back side of the flange. This often adversely affects the corrosion resistance of the piping system.

2. A corrosive resistant metallic ring is welded to the inner tube a distance back from the flange and the outer pipe is welded to this ring. This also adversely affects corrosion resistance and uncontrolled sections of the inner tube result.

3. The outer pipe is swaged to the outside of the inner tube and welded a distance back from the flange. When the two tubes are of different metals, the corrosion resistance often is affected even more adversely than above, and uncontrolled sections of the inner pipe are also produced.

These conventional methods of jacketing pipes conveying corrosive liquids are both costly and ineffective, as will be apparent from the foregoing.

The present invention has for one of its principal objects the provision of an improved jacketed pipe construction for use in the conveying of liquid corrosion-producing chemicals, which construction produces a close temperature control for the corrosive liquid passing through the jacketed pipe, and also the provision of an improved and simplified leak-proof pipe coupling.

A still further object of the invention is to provide an improved construction of the above-indicated character wherein corrosive resistant materials are used only where required for process reasons, non-corrosive material being bonded together where corrosion is not of primary importance.

A still further object of the invention is to provide a jacketed system for conveying corrosive liquids wherein the full length of the system is jacketed, with better control of the liquid or fluid within the tube system.

A still further object of the invention is to provide an improved jacketed system for conveying corrosive liquids together with a simplified pipe coupling which are both highly effective in controlling the temperature of corrosive liquids being conveyed, effective in inhibiting corrosion, and which is easily and inexpensively assembled.

The present invention provides a jacketed tube construction and a simplified coupling assembly for a jacketed tube or pipe, which is designed to minimize the problem of corrosion while maintaining an efficient heat exchange relation between the circulating liquid. In a jacketed line for the conduct of corrosive fluids, it is important in weldingly attaching the inner pipe to the corrosion resistant element of the coupling, that no heat interchange be effected with the corrosive resistant inner pipe and said coupling element. Therefore, one of the principal objects of this invention is the provision of a stainless steel liner comprising an anchoring flange on one side of the coupling flange member and terminating in a projection on the opposite side constituting a supporting seat for the end of the outer jacketing pipe or tube for the flange connecing elements of the inner corrosion-resistant pipe and the method or means of effecting the welding of the outer pipe jacket to the non-corrosive flange member of the coupling only, and without any detrimental amount of heat reaching the inner pipe or the stainless steel inner pipe-holding liner of the flange coupling member, and likewise to eliminate any welded connection between the inner and outer jackets at any point or points removed from the coupling, whereby the non-corrosive properties of the inner jacket will not be adversely affected.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a fragmentary elevation of an improved jacketed line and pipe coupling embodying the features of the present invention.

Fig. 2 is a transverse vertical section taken on the line 2—2 of Fig. 1, looking in the direction of the arrows.

Fig. 3 is a longitudinal sectional view with parts in elevation taken on the line 3—3 of Fig. 2, looking in the direction of the arrows.

Referring more particularly to the drawings, the improved pipe coupling of the present invention comprises the flange member 1, provided with a plurality of bolt holes 2 that are disposed concentrically around a central opening 3. The flange member 1 is provided with a tubular lining 4 of a different metal having a different coefficient of thermal expansion and having a plurality of spaced, parallel annular grooves 5 therein. When the coupling is intended for use in connection with the conveying of corrosive liquids, the flange member 1 may be made of cast iron and the lining 4 is desirably of corrosion resistant metal, suitably stainless steel, for instance, which is secured tightly in place in the flange member 1. The requisite tight fit between the flange member 1 and the tubular liner 4 may be effected in any suitable manner, such as by shrinking the member 1 onto the tubular member 4, or by contracting the latter until it contracts sufficiently to enter the central opening in the flange member 1. It will be understood that the central opening in the connecting flange member 1 is smaller in diameter by a few thousandths of an inch less than the outside of the tubular liner 4. It will be understood that while stainless steel cannot be welded owing to deleterious effects of overheating, the amount of heating of the connecting flange member 1 to permit its being shrunk onto the liner 4 does not heat the latter enough to affect its corrosion resistance, and at the same time firmly unites the connecting flange member 1 with the liner 4. This tubular liner 4 has an end flange 6 which is substantially larger than the central opening in the flange 1, and is seated on an annular shoulder 7 which is the bottom of an enlarged recess in the flange 1, provided to receive the flange 6 for purposes hereinafter explained. A gasket 8 of relatively soft compressible metal such as copper, desirably is inserted between the end flange 6 of the stainless steel liner 4 and the annular seat 7.

A pipe 9 having an outside diameter slightly less than the inside of the tubular lining 4 is inserted in the said lining with a rotary motion and is retained frictionally therein pending insertion of a suitable expanding tool, not shown. The pipe 9 is formed of a relatively soft and ductile metal such as lead, for example, or copper, or other soft, ductile, corrosion-resisting material, for conveying corrosive liquids. Entry of the said expanding tool into the open end of the pipe 9, frictionally held in the lining 4, is designed to expand the metal of the pipe 9 into the grooves 5 of the lining 4 to form interlocking projections 10 which securely lock and seal the pipe 9 in the stainless steel lining 4, and prevent the pipe from becoming displaced therefrom. After expansion of the pipe 9 the expanding tool is withdrawn.

In completing the coupling joint, a second similar flange member 1a having bolt holes 2 therein adapted to register with bolt holes 2 of flange member 1, is provided with a similar stainless steel liner 4 having the flange member thereon, and another pipe section 9 is interlocked with the grooves in the liner of the second flange 1a by expansion in a manner similar to that described above. If desired, a resilient yieldable gasket, not shown, may be interposed between the flange members 1 and 1a, the entire assembly being brought together with the bolt holes in said flange members in alignment for the passage of bolts 11 which join together the two halves of the completed coupling.

The tight and leak-proof engagement between the respective flange members and the corrosion-resisting liners 4 prevents entry of corrosive liquids around the liners should the same occur by sweating or otherwise, from reaching the flange members 1 and 1a proper, and at the same time the amount of the more expensive stainless steel is minimized by the use of the liners, so that the more costly metal is localized to the areas where needed.

The working of the relatively softer metal of the pipe or tube 9 is increased effectively by making the pipes or tubes with thin walls which permit the ready expansion and deformation of the pipe into locking engagement with the liner 4 of the flange member 1. The outer diameter of the pipe is only slightly smaller than the inner diameter of the annular bore of the liner 4, the insertion of the pipe being effected by a twisting or rolling motion as aforesaid, and a deformation of only a few thousandths of an inch is effective for the interlocking deformation of the pipe or tube, which interlocking deformation takes place with the pipe or tube in situ in the flange member.

The tube or pipe sections 9 are constructed of the usual metal employed to handle the given liquids. Where the metal is substantially hard in character the expansion can be effected and controlled by making the continuous wall thereof sufficiently thin to enable the requisite deformation thereof by the pressure of the expanding tool to form the interlocking projections or keys 10, depending upon the type of expander employed.

As has been pointed out above, the present invention contemplates the provision of a continuous jacket around the tube or pipe 9 defining a continuously uninterrupted annulus around the latter for the circulation of a heat exchanging fluid or liquid in thermal relation with the material passing through the inner, or conduit, pipe 9. Therefore, the invention contemplates the provision of the jacketing pipe 12 which encloses the pipe 9 completely, the end of the pipe 12 abutting against the connecting flange member 1.

In order to support and relieve the strain on the connections of the liner 4 with the flange 1 by reason of the weight of the length and load of the jacketing pipe 12, plus the weight and strain of the pipe 9, it is formed with an end flange 6 seating against the face of the recess in flange 1 and projects beyond the rear face of said flange forming a supporting seat 13 for the jacketing pipe 12. The end of pipe 12 thus supported is brought into engagement with the flange 1 and is joined integrally thereto with a continuous weld 14, which is a butt-weld completely exterior of the pipe 12, care being taken in forming this weld that it does not engage the liner 4, as the resulting welding heat would convert some of the chromium of the stainless steel of the liner into chromium carbide, thereby extracting such chromium from the stainless steel and consequently impairing the corrosion resistance of the liner. In practice all welding is accomplished before the corrosion resistant liner 4 is made fast to the flange 1 and to the jacketing tube or pipe 12. The pipe 12 is provided with a fluid intake connection 15 and an outlet 16, suitably located as desired.

It will be noted that by virtue of the construction of the liner 4 it may be inserted in the central opening 17 of the flange in a tight fit, and sealed and secured by reason of the flange 6 and arrangement of pipe 12 seating on the rear end of said liner and welding 14, presenting a balanced connection with said flange to provide a coupling adapted to withstand the stresses incident to the jacketed line, as will be well understood.

It is to be understood that in assembling and connecting the coupling by tightening the nuts on bolts 11, as shown in Fig. 1, a suitable gasket (not shown) may be interposed between the flanges 1—1a and the contacting faces of the flange portions 6 of the liners 4, as desired.

From the foregoing description it will be seen that costly corrosive resisting materials are used only in localized areas where required for process reasons, and the full length of the system is jacketed, thereby attaining close temperature control of the material flowing through the pipe 9. The assembly of the present system also prevents leakage of corrosive liquid around any of the parts. Furthermore, the provision of thin walls for the pipe 9 permits a higher efficiency of heat transfer between the enclosing jacket and the fluid in the pipe 9, and it is found in practice that the advantages of the present construction are realized at a substantially lower cost as compared with the conventionally employed assembling techniques.

From the foregoing description it will be apparent that various operational details of assembling the improved jacketed pipe coupling of the present invention may be varied rather widely without departing from the inventive concept, and it will be understood therefrom that it is intended and desired to embrace within the scope of the invention such modifications and changes as may be necessary to adapt it to varying conditions and uses, as defined in the appended claims.

Although in practice I have found that the form of my invention illustrated in the accompanying drawings and referred to in the above description as the preferred embodiment, is the most efficient and practical; yet realizing that conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A bi-metal jacketed pipe construction comprising in combination, an inner conduit pipe having a uniform internal surface for conveying a body of fluid therethrough, an outside pipe enclosing the conduit pipe and continuously spaced therefrom to define a continuous annulus between the conduit pipe and outer pipe for circulation of temperature-controlling fluid around the conduit pipe, and a terminal pipe coupling assembly carried by the conduit pipe including a corrosion-resisting liner mounted on the conduit pipe, means interlocking the conduit pipe and liner, a coupling flange member mounted on the liner, a terminal flange on the liner seated in the coupling flange member, a compressible annular gasket intermediate the terminal flange on the liner and the coupling flange member, a seat portion on the liner extending along and embracing the conduit pipe, the outer pipe being seated on the seat portion and abutting against the coupling flange, and a continuous butt weld extending around the outer pipe exteriorly thereof and continuously bonding the outer pipe to the coupling flange, the said weld being continously spaced away from contact with the said liner by an amount equal to the thickness of the outer pipe for preventing overheating of the liner during assembling of the pipe coupling assembly.

2. A pipe assembly and coupling structure for conveying corrosive liquids, which comprises an inner pipe, an outer pipe spaced from the inner pipe and defining a jacket therefor, means for circulating a heat exchanging fluid through the outer pipe and around the inner pipe in heat exchanging engagement therewith, and a bi-metal coupling assembly for the inner and outer pipes, the coupling assembly comprising a pair of flange members detachably united in face-to-face relation, each flange member also having a substantially planar rear surface and being formed with a central opening and having an annular recess on its face, a tubular liner mounted in the central opening of each flange member, an end flange on the liner seated in the annular recess on the face of the said flange member, the said tubular liner having an opposite end extending through the flange member and into an adjacent end of the outer pipe to provide a seat for the outer pipe, the said planar rear surface of the flange member abutting against the said adjacent end of the outer pipe, the said flange member, and outer pipe being composed of ordinary steel, a continuous weld union betwen the flange member and the adjacent end of the outer pipe, the said liner being composed of stainless steel and having a plurality of spaced, flat bottom parallel grooves therein, the grooves also having right angle walls as well as flat bottoms, the said inner pipe of the pipe assembly being composed of a relatively soft and ductile metal resistant to corrosion by liquid flowing through the inner pipe, the said inner pipe having an exterior surface and an internal surface, the inner pipe being inserted into the stainless steel liner with an adjacent end of this inner pipe flush with the face of the flange member, the exterior surface of the inner pipe being expanded into the spaced parallel grooves in the liner without deformation of the internal surface of the inner pipe and forming, conjointly with the right angle walls of the grooves, interlocking keys for locking the said adjacent end of the inner pipe against stresses of a fluid-conveying load, the said flange member having a shrink fit with the said liner uniting the flange member and the liner.

References Cited in the file of this patent

UNITED STATES PATENTS

| Number | Name | Date |
|---|---|---|
| 232,259 | Graham | Sept. 14, 1880 |
| 318,971 | Evans | June 2, 1885 |
| 418,572 | Rogers | Jan. 7, 1890 |
| 541,507 | Sellers | June 25, 1895 |
| 1,265,706 | Bardeen | May 7, 1918 |
| 1,276,394 | Monrath | Aug. 20, 1918 |
| 1,349,663 | Cumfer | Aug. 17, 1920 |
| 1,397,080 | Coleman | Nov. 15, 1921 |
| 1,481,255 | Cumfer | Jan. 22, 1924 |
| 1,490,123 | Murray | Apr. 15, 1924 |
| 1,736,610 | Loffler | Nov. 19, 1929 |
| 2,027,787 | Ridgway et al. | Jan. 14, 1936 |
| 2,449,052 | Brown, Jr. | Sept. 14, 1948 |

FOREIGN PATENTS

| Number | Country | Date |
|---|---|---|
| 410,080 | Germany | Nov. 29, 1922 |